Aug. 5, 1952 J. D. GOW 2,605,633

INSULATOR TESTING APPARATUS

Filed July 23, 1946

INVENTOR
JAMES D. GOW

BY Robert A. Lavender
ATTORNEY

Patented Aug. 5, 1952 2,605,633

UNITED STATES PATENT OFFICE 2,605,633

INSULATOR TESTING APPARATUS

James D. Gow, San Francisco, Calif., assignor to the United States of America as represented by the United States Atomic Energy Commission Application July 23, 1946, Serial No. 685,642

1 Claim. (Cl. 73—67)

This invention relates to insulator testing apparatus in general. More particularly, this invention relates to apparatus of an improved character for mechanically testing insulators.

An object of this invention is to provide an improved apparatus for mechanically testing the solder joint between a porcelain bushing and the disk-shaped metal end plate of an insulator.

Other and further objects of the invention will be apparent to those skilled in the art to which it relates from the following specification, claim and drawing.

In order to test a solder joint between a porcelain bushing and a disk-shaped metal member in accordance with the present invention, an audio-oscillator is frequency modulated by the output of a sawtooth oscillator, the output terminals of the audio oscillator being connected to the disk-shaped metal member and the mounting base. Thus are the oscillations translated into mechanical vibrations by condenser transducing arrangement.

At the other end of the bushing, a crystal pick-up in contact therewith translates the vibrations transmitted through the bushing into an electrical signal, which signal is detected and applied to the vertical plates of an oscilloscope. The output of the sawtooth oscillator is also applied to the horizontal plates of the oscilloscope so that the trace on the screen is a graph of the transmission through the bushing versus the frequency.

The frequency modulated audio oscillator may be a conventional phase shift type which includes a phase shift network comprising three triodes respectively connected in series with three resistors, and capacitors connected between each series. The triodes function as variable resistors, and the network shifts the phase of the signal input thereto. The output of the network is fed back to the grid of an amplifier, the output of which is coupled through a cathode follower stage to an input of the network. The frequency modulated signal is derived from the cathode of the follower stage.

Figure 1:
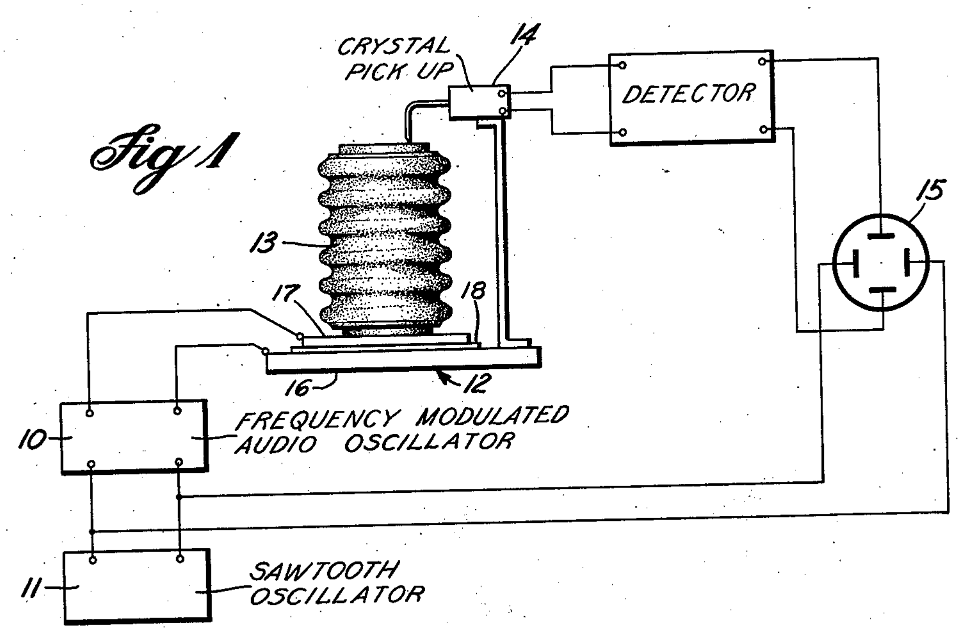

Referring to the drawing briefly. Figure 1 is a schematic showing of an embodiment of this invention; and Fig. 2 is a schematic wiring diagram of an electron tube oscillator.

Referring to the drawing in detail, there is shown in Fig. 1 a standoff insulator 13 which may include metal and porcelain elements joined as by soldering or bonding metal. Insulator 13 rests upon a capacitor transducer 12 which comprises a metal base plate 16, a metal disk 17, and a solid dielectric 18 therebetween, as for example polystyrene foil. Transducer 12 is energized by an audio oscillator 10 which is frequency modulated by a sawtooth oscillator 11; the frequency modulated signal from audio oscillator 10 being applied between plate 16 and disk 17 of capacitor transducer 12 which produces corresponding mechanical vibrations of the condenser dielectric 18. The frequency modulated vibrations produced by capacitor transducer 12 are imparted to insulator 13 and are received by a crystal pickup 14 contacting the other end of insulator 13. Crystal pickup 14 translates the received mechanical vibrations into a corresponding electrical signal which is detected and applied to the vertical plates of an oscilloscope 15. The output of the sawtooth oscillator is applied to the horizontal plates of the oscilloscope 15 and the trace on the screen is a graph of the transmission through the insulator bushing versus the frequency. A good insulator is evidenced by high peaks and/or a large area under the graph at the resonant frequency of the particular insulator under test, while a flat low graph is an indication of a defect, for example, a poor joint which decreases the resonant response.

Figure 2:
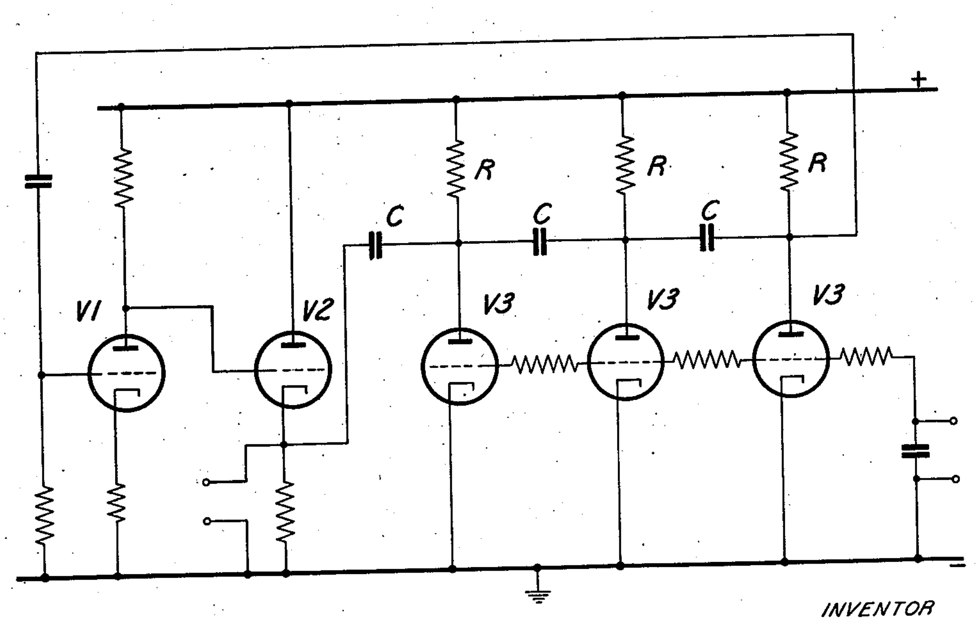

In Fig. 2, there is illustrated a frequency modulated audio oscillator of the phase shift type which may be employed in the present apparatus. A tube V1 has its output coupled through a cathode follower stage V2 to the input of a phase shift network including the capacitors C, resistors R and variable resistors comprising the tubes V3 whose resistances are determined by the signal on their control grids. The output of the filter network is coupled to the input of tube V1 and the output of the oscillator is taken from across the resistor in the cathode follower stage V2. By varying the potential applied to the grids of tubes V2, which is accomplished by the application of the output of sawtooth oscillator 11 thereto, the frequency and phase shift characteristics of the filter network are changed to vary the oscillator frequency, whereby a frequency modulated output responsive to the grid input to tubes V3 is obtained. The use of the cathode follower stage greatly increases the oscillator efficiency inasmuch as tube V1 looks into a high impedance.

While I have described the salient features of this invention in detail with respect to one embodiment, it will of course be apparent that numerous modifications may be made within the spirit and scope of this invention and I do not therefore desire to limit the invention to the exact details shown except in so far as they may be defined in the following claim.

What is claimed is:

Insulator testing apparatus associated with an insulator having bonded elements, and comprising an audio oscillator, a sawtooth oscillator connected to said audio oscillator and frequency modulating the output signal thereof, the frequency of said sawtooth oscillator being adjustable to modulate the audio oscillator signal in a frequency range including the resonant frequency of said insulator, a capacitive transducer electrically connected to the output of said audio oscillator and mechanically connected to said insulator to transmit therethrough mechanical vibrations corresponding to the output signal of said audio oscillator, a crystal pickup contacting the opposite side of said insulator from said transducer and receiving mechanical vibrations transmitted by said insulator from said transducer, said pickup producing an electrical signal proportional to the mechanical vibrations received thereby, an oscillograph having first and second sets of deflecting plates, and electrical connections from said crystal pickup to the first set of oscillograph deflecting plates and from the output of said sawtooth oscillator to the second set of oscillograph deflecting plates whereby said oscillograph produces a trace of the resonant curve of said insulator as a measure of the bonding of the elements thereof.

JAMES D. GOW.

REFERENCES CITED

The following references are of record in the file of this patent:

UNITED STATES PATENTS

| Number | Name | Date |
|---|---|---|
| 2,008,857 | Flanders | July 23, 1935 |
| 2,280,226 | Firestone | Apr. 21, 1942 |
| 2,321,269 | Artzt | June 8, 1943 |
| 2,384,716 | Wengel | Sept. 11, 1945 |
| 2,431,233 | Erwin | Nov. 18, 1947 |
| 2,431,234 | Rassweiler et al. | Nov. 18, 1947 |
| 2,433,963 | Tarbox | Jan. 6, 1948 |
| 2,484,623 | Heising | Oct. 11, 1949 |

FOREIGN PATENTS

| Number | Country | Date |
|---|---|---|
| 899,646 | France | Aug. 28, 1944 |